United States Patent
Rode et al.

(10) Patent No.: US 8,533,307 B2
(45) Date of Patent: Sep. 10, 2013

(54) METHOD AND DEVICE FOR MONITORING A DATA TRANSMISSION

(75) Inventors: Detlef Rode, Hemmingen (DE); Uwe Zurmuehl, Giesen (DE)

(73) Assignee: Robert Bosch GmbH, Stuttgart (DE)

( * ) Notice: Subject to any disclaimer, the term of this patent is extended or adjusted under 35 U.S.C. 154(b) by 2867 days.

(21) Appl. No.: 11/044,119

(22) Filed: Jan. 26, 2005

(65) Prior Publication Data

US 2005/0165940 A1    Jul. 28, 2005

Related U.S. Application Data

(63) Continuation-in-part of application No. PCT/DE03/02426, filed on Jul. 21, 2003.

(51) Int. Cl.
*G06F 15/173* (2006.01)
*G06F 11/00* (2006.01)

(52) U.S. Cl.
USPC .......................... 709/223; 370/235

(58) Field of Classification Search
USPC .......................... 709/223; 370/235
See application file for complete search history.

(56) References Cited

U.S. PATENT DOCUMENTS

| | | | |
|---|---|---|---|
| 5,627,970 A * | 5/1997 | Keshav | 709/233 |
| 6,448,735 B1 | 9/2002 | Gokhale et al. | |
| 6,505,253 B1 * | 1/2003 | Chiu et al. | 709/235 |
| 7,035,214 B1 * | 4/2006 | Seddigh et al. | 370/231 |
| 7,203,167 B2 | 4/2007 | Meyer et al. | |
| 2002/0015408 A1 | 2/2002 | Pitcho et al. | |
| 2002/0145976 A1 * | 10/2002 | Meyer et al. | 370/235 |

FOREIGN PATENT DOCUMENTS

| | | |
|---|---|---|
| CN | 1511396 | 7/2004 |
| JP | 63197259 | 8/1988 |
| JP | 3165139 | 7/1991 |
| JP | 10173668 | 6/1998 |
| KR | 20020019334 | 3/2002 |
| WO | WO 00/21231 | 4/2000 |
| WO | WO 01/91279 | 11/2001 |
| WO | WO 03/026121 | 3/2003 |

OTHER PUBLICATIONS

Petr Cach, Petr Fiedler, "IP over CAN", Mar. 2001, Internet-draft, pp. 1-12.*
Laurent Roy, Lucas Varity, "ISO and OSEK Harmonisation Efforts", Nov. 13, 1998, IEE seminar, pp. 1-3.*

(Continued)

*Primary Examiner* — Minh-Chau Nguyen
(74) *Attorney, Agent, or Firm* — Kenyon & Kenyon LLP (57) ABSTRACT

A method for monitoring a data transmission between at least two network users, in particular according to the ISO 15765-2 transmission protocol, is described, at least one sender transmitting data to at least one receiver in the form of data telegrams, a data transmission taking place via at least one data telegram and the receiver transmitting at least one flow control telegram to the sender when the data of a data transmission is transmitted in a segmented manner in a first data telegram and at least one subsequent data telegram, an additional flow control telegram being transmitted from the receiver to the sender after the last data telegram of a data transmission.

40 Claims, 3 Drawing Sheets

(56) References Cited

OTHER PUBLICATIONS

Bridal, et al., "On the Design of Communication Protocols for Safety-Critical Automotive Application", Vehicular Technology Conference, 1994 IEEE 44th Stockholm, Sweden, Jun. 8-10, 1994, New York, IEEE, Jun. 8, 1994, pp. 1098-1102.

ISO/TC22/SC3, Draft International Standard ISO/DIS 15765-2 2 (15765-2.4): Road Vehicles—Diagnostics on Controller Area Networks (CAN)—Part 2: Network Layer Services, 2003, ISO, Geneva.

Bettendorf, D. et al. "Requirements Analysis Document" 2003, pp. 1-19, Onboard Diagnostic Systems.

\* cited by examiner

Fig.5

METHOD AND DEVICE FOR MONITORING A DATA TRANSMISSION

CROSS REFERENCE TO RELATED APPLICATIONS

The present application is a continuation-in-part of International Application PCT/DE03/02126 filed on Jul. 21, 2003 (priority to which is claimed under 35 U.S.C. §120), and expressly incorporated herein by reference in its entirety. The present application also claims priority under 35 U.S.C. §119 to Application No. 102 34 348.9, filed in the Federal Republic of Germany on Jul. 26, 2002, and expressly incorporated herein by reference in its entirety.

FIELD OF THE INVENTION

The present invention relates to a method and a device for monitoring a data transmission between at least two network users.

BACKGROUND INFORMATION

Methods for data transmissions, the corresponding transmission protocols in particular, are used everywhere where large amounts of data, referred to in the following as messages, are to be securely transmitted in small packets, referred to in the following as data telegrams or also data frames. A CAN telegram (CAN: controller area network), for example, allows transmission of a certain number of useful bytes. If larger packets or amounts of data are to be transmitted, a transmission protocol must be used for the segmentation of these messages at the sender or the assembly at the receiver.

The ISO (International Standardization Organization) has issued standard 15765 in particular for diagnostic applications. A transmission protocol, in which no confirmation of the transmitted messages takes place within the scope of a data transmission, is specified in part two of the ISO standard 15765-2. In addition, acknowledgements are often not needed, since data or messages containing certain information are sent cyclically in different applications, in the automobile industry in particular. If data, a message in particular, is lost in the process, synchronization of the lost data simply takes place in the next message.

However, if messages are exclusively transmitted in an event-driven manner, an absent confirmation of the message is not acceptable.

Possible approaches to the problem of the absent confirmation, in CAN-based systems in particular, result from the fact that a transmission protocol, exclusively provided for this purpose, is used, this transmission protocol, however, having the disadvantage of being incompatible with protocols required for a plurality of applications within the diagnostic scope in the motor vehicle, or that the required confirmation is executed on higher protocol layers, known as an additional security layer, resulting disadvantageously in substantially higher costs at a higher error rate, as well as in greater inefficiency, in particular due to a higher bus load.

SUMMARY

Therefore, it is an object of the present invention to expand an existing transmission protocol, a transmission protocol according to ISO standard 15765-2 in particular, which is highly compatible with numerous applications, to the effect that the protocol itself is not significantly modified and, although not provided in the protocol, a confirmation of the messages is made possible.

In accordance with the present invention, an example method and an example device are provided for monitoring a data transmission between at least two users of a network, at least one sender transmitting data in the form of messages made up of data telegrams to at least one receiver, a data transmission taking place via at least one data telegram and the receiver subsequently transmitting at least one flow control telegram to the sender when data of a data transmission is transmitted in a segmented manner in one first data telegram and at least one following data telegram, an additional flow control telegram being advantageously transmitted from the receiver to the sender after the last data telegram of a data transmission.

The data transmission may advantageously take place according to the ISO 15765-2 protocol.

The compatible expansion of an existing protocol, the ISO standard 15765-2 in particular, may represent an intrinsic advantage of the described method and device, without this ISO standard in particular being significantly modified, i.e., no new or modified telegrams, protocol control information in particular, are introduced, for example.

A confirmed communications service or a confirmed data transmission is advantageously achieved at little cost.

By merely implementing the conventional protocol, mere ISO implementation in particular, receivers, which act as observers (tooling), may appropriately continue to be operated in the network within the scope of the described protocol expansion without any problems.

Confirmation of a data transmission is advantageously made possible within the scope of ISO standard 15765-2 by transmitting an additional flow control telegram (FC) after the last data telegram of a data transmission.

A distinction is advantageously made between two types of such flow control telegrams (FC), a first flow control telegram (FC.CTS) being used as a positive confirmation and a second flow control telegram (FC.WAIT) being used as a negative confirmation.

It may also be advantageous if the sender checks whether a flow control telegram is received within a predefinable first time period N_Bs_timeout after sending at least one data telegram and, in case of an error, that the sender repeats the last sent data telegram or all last sent data telegrams of a data transmission.

It is likewise practical if the sender checks whether the receiver may be operated in a confirmed transmission mode, i.e., transmitting the flow control telegram at the end of the data transmission, in that the sender transmits an individual test message or configuration message and checks the receipt of the flow control telegram as a confirmation.

Two transmission modes may be advantageously distinguished, a first transmission mode allowing the transmission of the additional flow control telegram from the receiver to the sender after the last data telegram of a data transmission and a second transmission mode not allowing this, the sender operating in the first transmission mode upon receipt of the flow control telegram after the test message or configuration message at the sender and switching over to the second transmission mode in the other case.

In a particular example embodiment it may additionally be checked whether the flow control telegram is received by the sender after the test message or configuration message within a predefinable second time period N_Bs_timeout 2.

In a particular example embodiment, the first and the second time periods are identical (N_Bs_timeout=N_Bs_timeout_2).

In a further particular embodiment, in each instance, the first message, which is already waiting to be sent to a specific receiver, may be selected as a test message.

Use of a computer program on a data medium for applying the method according to the present invention represents a particularly advantageous implementation and application of the present invention.

The present invention, further described in the following, results in a very efficient improvement in network security, since the network may be operated in a confirmed transmission mode, and a conventional, highly compatible transmission protocol, the ISO 15765-2 in particular, may be used and at the same time network users, which do not contain the expansion of the standard protocol according to the present invention, may still be operated within the existing network.

BRIEF DESCRIPTION OF THE DRAWINGS

The present invention is explained in greater detail based on the figures.

DESCRIPTION OF EXAMPLE EMBODIMENTS

Figure 1:
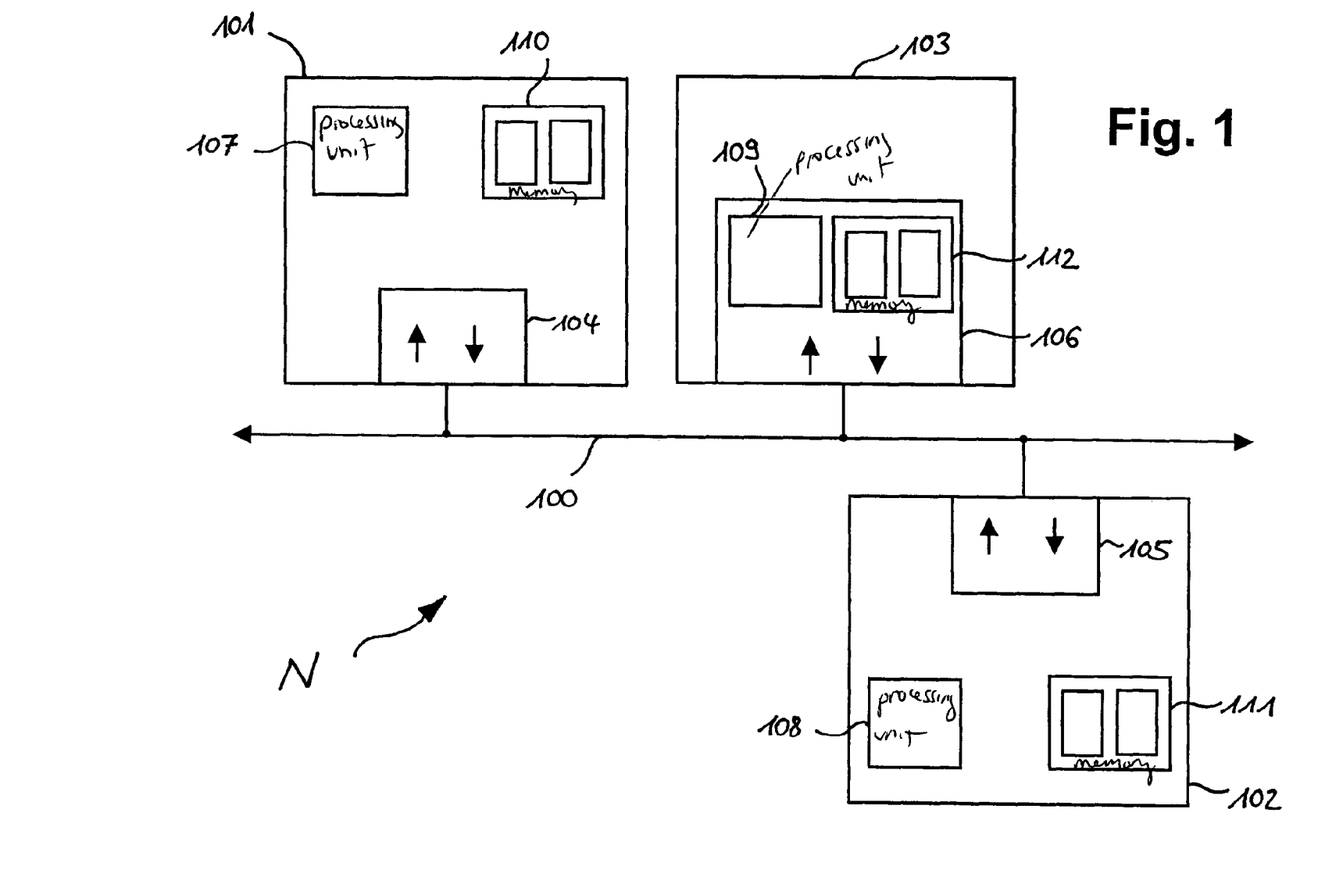
FIG. 1 shows a network or a bus system having at least two users within the scope of the data transmission to be monitored.

FIG. 1 shows a network N having a bus connection 100 and at least two users 101 and 102. Additional users, like 103 here, are optional, but of course possible according to the present invention. The network or bus system, in particular corresponding to ISO 15765-2, is a CAN system for example, in a vehicle in particular. Other applications, in particular in the areas of machine tools, industrial goods, and durable consumer goods, as well as other bus systems are of course possible.

Furthermore, the transmission protocol is based on the aforementioned ISO 15765-2, in particular ISO/DIS 157652-2, as of Nov. 30, 1999 (ISO/TC 22/SC 3/WG 1/TF 2 N 124). However, any other protocol, which has the characteristics of this ISO standard utilized according to the present invention and does not offer a confirmed service, is also conceivable.

The bus users in the example in FIG. 1 include a bus interface 104, 105, and 106, processing units 107, 108, and 109, as well as memory elements 110, 111, and 112. These processing units or memory elements may be accommodated in the user itself as illustrated in 101 and 102, or they may also be integrated into the interface unit according to user 103. Processing of methods according to the present invention, e.g., for entering a particular program, takes place via the processing units, in particular in connection with the memory elements. A computer program according to the present invention may be stored in the memory elements illustrated in FIG. 1, or may also, in particular before being implemented therein, be located on other data carriers. All possible data carriers, as well as a transmission, via the Internet for example, are usable according to the present invention.

In accordance with the present invention, the particular utilization of a flow control telegram, i.e., in particular, the flow control telegram FC of the mentioned ISO standard, is utilized. According to the example method of the present invention, a flow control telegram FC is additionally transmitted from the receiver of the message to the sender at the end of each transmission. For example, user 101 as the sender and user 102 as the receiver are provided with regard to an exemplary data transmission. Of course, each user, within the scope of a CAN system in particular, may be a sender as well as a receiver. It is also possible according to the present invention to determine which user acts as sender and which user acts as receiver. According to the present invention, these standard flow control telegrams (flow control frame FC), as positive or negative confirmation of the entire message, i.e., all data telegrams belonging to the message, are interpreted as follows: Two types of flow control telegrams FC may be distinguished: FC.CTS (flow status: continue to send) and FC.WAIT (flow status: wait). According to the present invention, the FC.CTS is used as a positive confirmation, i.e., as a confirmation of an error-free transmission, and the FC.WAIT as a negative confirmation, i.e., as an indication of a transmission error. The reverse use of the two types of flow control telegrams would also be possible.

Examples of the present invention are illustrated in the form of flow charts or sequence diagrams based on FIGS. 2 through 5. The abbreviations according to ISO/DIS 15765-2 are used in the following description.

SF: single frame, an individual message,
FC: flow control, flow control telegram,
FC.CTS: flow control (continue to send) as a positive confirmation,
FC.WAIT: flow control (wait) as a negative confirmation,
FF: first frame as a first data telegram of a message made up of at least two data telegrams,
CF: consecutive frame as a subsequent data telegram of a message made up of at least two data telegrams, and
N_Bs: network layer timing parameter Bs, i.e., the maximum waiting time until the next FC reception.

The expansions of the example method according to the present invention compared to the standard protocol are illustrated using dashed lines. For the sake of clarity, timer N_Bs is merely indicated at the point which is important for explaining error detection. This is the case in FIG. 4.

The cases of short data transmissions in which only one data telegram SF is to be transmitted, as well as long data transmissions having multiple data telegrams FF and CF, are generally covered. The basic principle of the present invention is the same in each case, i.e., the receiver transmits an additional flow control block FC after receipt of the particular last data telegram SF or last CF. It is important for this flow control telegram FC to meet exactly the basic standard transmission protocol, i.e. in this example, the ISO specification with regard to its format. Only the interpretation of the flow control telegrams experiences an expansion. An FC.CTS is rated by the sender as a positive confirmation; an FC.WAIT, however, is rated as a negative confirmation.

Figure 2:
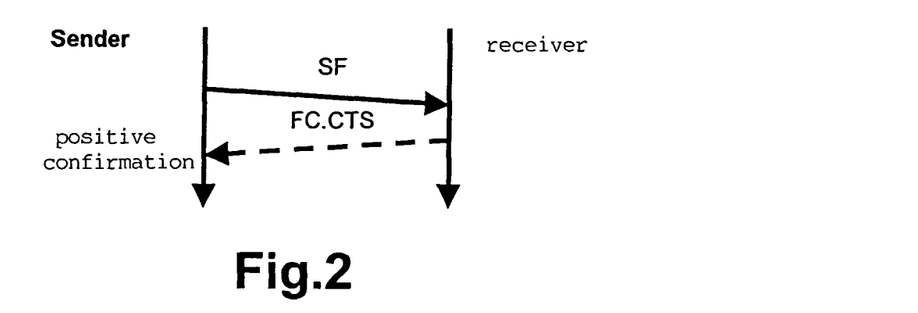
FIG. 2 shows a first flow chart within the scope of a message confirmation of a message made up of a single data telegram SF, referred to below as an individual message.
Figure 3:
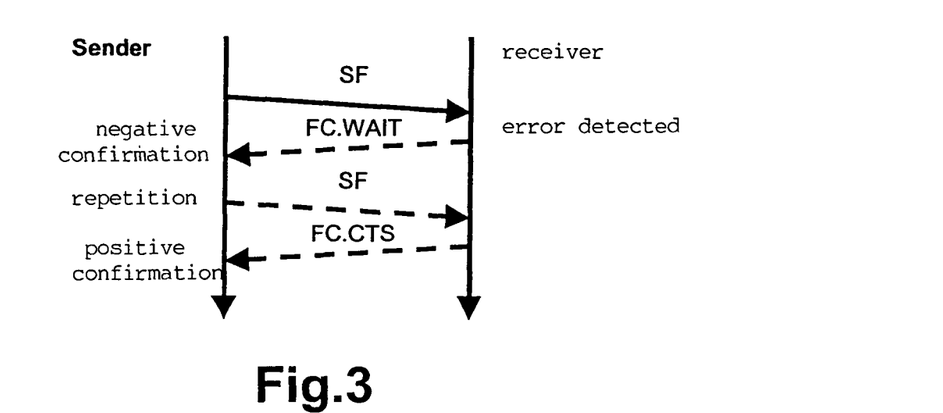
FIG. 3 shows a second flow chart of a negative message confirmation of an individual message, i.e., the case of a recognized error.

The flow chart or the sequence in FIG. 2 shows the telegram sequence in a short, i.e., a non-segmented data transmission, i.e., an error-free individual message SF. The sender, in particular user 101, sends a telegram SF to the receiver, here user 102 in particular. After the receiver has received the SF telegram, i.e., the individual message, it sends an FC.CTS telegram, i.e., the corresponding flow control telegram, to the sender as a positive confirmation in this positive case. As an expansion compared to the ISO protocol, the sender thus receives a confirmation of the individual message SF.

FIG. 2 shows a flow chart or a sequence which corresponds to the flow chart or sequence of FIG. 1, with the difference that the receiver detects an error during reception of the individual message, i.e., the SF telegram. Upon or subsequent to recognizing an error, the receiver sends a negative confirmation to the sender, i.e., the flow control telegram FC.WAIT. As an error response, the sender may repeat its individual message, i.e., its SF telegram, and, as illustrated here as an example, is successful this time, which is reflected by the positive confirmation via flow control telegram FC.CTS from the receiver to the sender.

Figure 4:
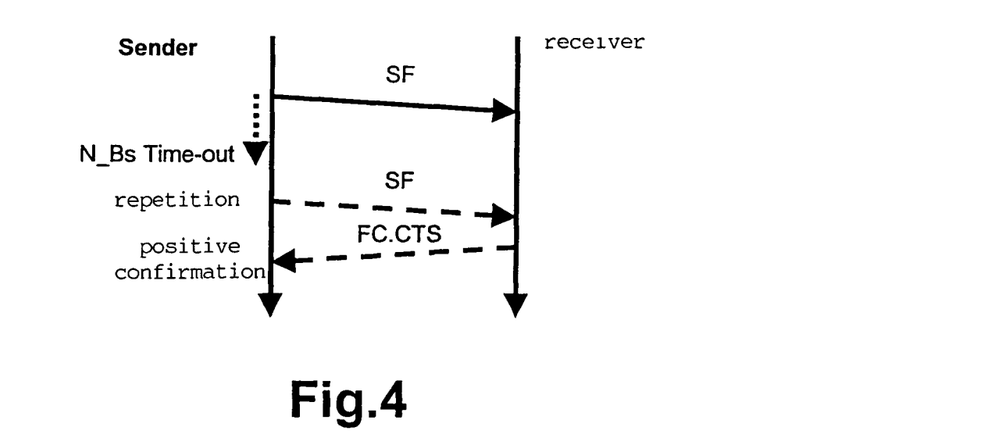
FIG. 4 shows a particular exemplary embodiment of an individual message with timeout.

A particular case is illustrated in FIG. 4. A case is addressed in this flow chart or this sequence in which the receiver erroneously does not send a flow control telegram, i.e., no FC telegram, as a confirmation, because the individual message SF was lost during transmission, for example. This case may also be recognized by a particular embodiment, i.e., by the sender's monitoring of a first time period. Timer N_Bs, provided in the ISO standard, may be used, which is always activated when a flow control telegram must be awaited. For practical reasons, exactly the same timer N_Bs is used at this point, and the sender monitors time period N_Bs timeout. According to the present invention, it is also possible to use a different timer or a different time period, the use of N_Bs having the advantage of minimizing the adaptation of the existing protocol. As a response to the elapsed time period N_Bs timeout, the individual message SF is repeated as an error response, which in turn results in a positive confirmation via an FC.CTS, for example. Of course, combinations of all sequences illustrated in connection with the present invention, i.e., with a detected error, without a detected error, with a timeout, without a timeout, etc., are possible and covered by the present invention.

Figure 5:
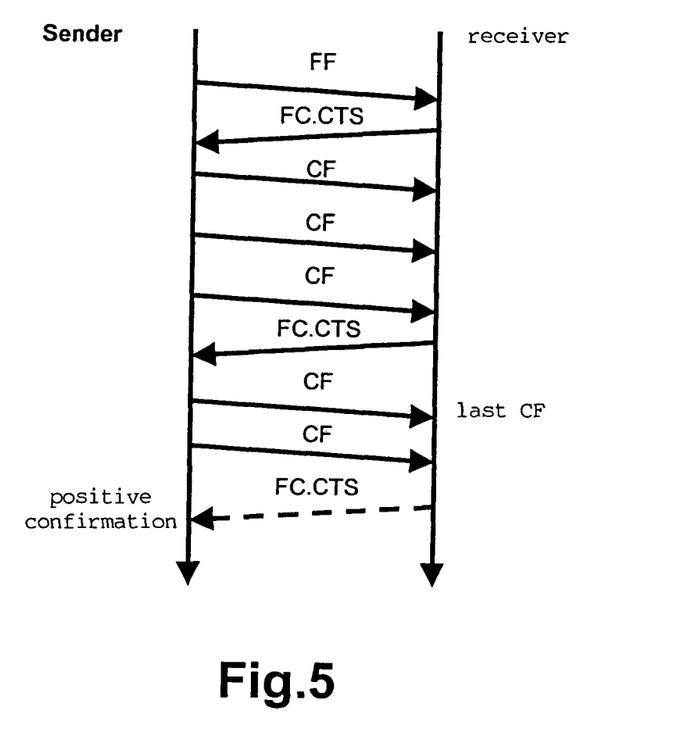
FIG. 5 shows a fourth flow chart of the message confirmation with segmented data transmission.

Finally, a long, i.e., a segmented data transmission, is illustrated in the flow chart or in the sequence in FIG. 5. In such a segmented data transmission, when a first data telegram FF and further subsequent data telegrams CF are used, the standard flow control telegram is initially used and, following the first data telegram FF, an FC.CTS is sent which, according to ISO 15765-2 for example, contains the information BS and $ST_{min}$, i.e., the block size and the minimum interval between two subsequent data telegrams CF. As an expansion of the ISO standard, only after the last data telegram CF (or lastCF) is a positive confirmation sent from the receiver to the sender. In this connection, the determination of the last data telegram of a message is a function of the utilized transmission protocol. For example, this determination may be carried out according to ISO 15765-2, using protocol information in the first data telegram (SF or FF). However, transmission protocols having marked, last data telegrams are also possible. Corresponding to FIGS. 3 and 4, the error cases illustrated there are also possible here and may be dealt with. However, only the erroneous data telegram or the sequence of erroneous data telegrams may possibly be repeated between two flow control telegrams, but due to the design of the ISO standard protocol, the entire message, i.e., all data telegrams, is normally repeated in case of an error.

The compatibility with purely ISO-conforming implementations will be briefly addressed in the following, i.e., implementations at individual users, which does not allow an interpretation according to the present invention. The method according to the present invention presumes that the sender by waiting for a confirmation by a flow control telegram, as well as the receiver by sending the confirmation in the form of a flow control telegram must be modified, in particular adapted with respect to the program. This also means that an old sender, i.e., a purely ISO-conforming sender, would function smoothly with a new receiver according to the present invention.

This may become a problem, however, when a sender according to the present invention cooperates with a purely ISO-conforming receiver. In particular, due to a timeout in the sender, this would result in undesirable repetitions. In order to enable downward compatibility nonetheless, the method may be complemented by a configuration run in a special embodiment. For example, as a result of the sender according to the present invention sending a test message, it may be determined whether or not a flow control telegram returns within a predefinable second time period N_Bs_timeout_2. If the answer is yes, a transmission mode according to the present invention, i.e., with confirmed services, may be used. Otherwise a switch must be made to the purely ISO-conforming transmission mode with regard to this receiver, i.e., without the expansion according to the present invention.

Two variants are possible for this configuration run. First of all, in each instance, the first message, which is already waiting to be sent to a specific receiver, may be selected as a test message. Each such test message may be advantageously sent immediately after the system has started. If the configuration run is performed in this manner, a receiver, expanded according to this proposal, basically operates during start-up following the protocol according to the present invention, in order to respond already to the sender's first message and to send the flow control telegram as a confirmation. Only the combination of a new sender according to the present invention and an old purely ISO-conforming receiver prevents a confirmation operation according to the present invention. According to the present invention, a switch is made to the purely ISO-conforming protocol in this case.

On the other hand, a configuration run having an identified message, which is referred to in the following as a configuration message, is also conceivable. In this connection, each network user must generally behave in a purely ISO-conforming manner, until the expanded operating mode, if supported, is agreed upon via a configuration message at an arbitrary time. The switchover to the method of the present invention is carried out in a manner analogous to the procedure mentioned further above, i.e., only when the receiver sends the flow control telegram as an acknowledgement within time N_Bs_timeout_2.

To increase the reliability, a configuration run may also be executed multiple times in succession, in order to effectively eliminate or minimize errors occurring in the configuration run.

Although a highly compatible standard protocol is used, in which in fact no confirmation operation is provided, the present invention makes it possible to introduce a confirmation operation. Based on the positive confirmation, the error-free case or positive case is recognized virtually instantly, i.e., no additional timeouts or the like are to be observed for higher layers (e.g. application software). In addition, the implementation according to the present invention may be very simple to execute, involves a relatively small expansion of the existing layer or the existing protocol, and is generally less expensive than a protocol layer specially implemented for the confirmation according to the initially mentioned security layer.

What is claimed is:

1. A method for monitoring a data transmission between at least two network users, comprising:
   transmitting, by at least one sender data in a form of data telegrams to at least one receiver, a data transmission taking place via at least one data telegram;

transmitting, by the receiver, at least one flow control telegram to the sender when the data of a data transmission is transmitted in a segmented manner in a first data telegram and at least one subsequent data telegram;

transmitting an additional flow control telegram from the receiver to the sender after a last data telegram of a data transmission; and checking, by the sender, whether the receiver can be operated in a confirmed transmission mode with sending of the flow control telegram at the end of the data transmission in that the sender sends one or more test or configuration messages and checks receipt of a corresponding flow control telegram as a confirmation, so as to provide efficient network security, in which the network may be operated in the confirmed transmission mode and a conventional transmission protocol, and in which before communicating in the more advanced mode of the confirmed transmission mode, the sender checks whether such an operation is feasible.

2. The method as recited in claim 1, further comprising:
checking, by the sender, whether the receiver can be operated in a confirmed transmission mode with sending of the flow control telegram at the end of the data transmission in that the sender sends one or more test or configuration messages and checks receipt of a corresponding flow control telegram as a confirmation;

wherein the data transmission is executed according to the ISO protocol 15765-2, and wherein a first flow control telegram type is used as a positive confirmation and a second flow control telegram type is used as a negative confirmation.

3. The method as recited in claim 2, wherein two transmission modes are differentiated, a first transmission mode allowing the transmission of the additional flow control telegram from the receiver to the sender after a last data telegram of a data transmission, and a second transmission mode not allowing the transmission, the sender operating in the first transmission mode upon receipt of the flow control telegram after the test or configuration message at the sender, and switching over to the second transmission mode in the other case.

4. The method as recited in claim 3, wherein, in each instance, a first message already waiting to be sent to a specific receiver is also selected as the test message.

5. The method as recited in claim 3, wherein an identified configuration message allows a switchover into a confirmed operating mode at any arbitrary time, to the extent that the operating mode is supported.

6. The method as recited in claim 2, further comprising:
checking to determine whether the sender receives the flow control telegram after the test or configuration message within a predefinable second time period;
wherein the second time period is identical with the first time period.

7. The method as recited in claim 1, wherein two transmission modes are differentiated, a first transmission mode allowing the transmission of the additional flow control telegram from the receiver to the sender after a last data telegram of a data transmission, and a second transmission mode not allowing the transmission, the sender operating in the first transmission mode upon receipt of the flow control telegram after the test or configuration message at the sender, and switching over to the second transmission mode in the other case.

8. The method as recited in claim 7, wherein, in each instance, a first message already waiting to be sent to a specific receiver is also selected as the test message.

9. The method as recited in claim 7, wherein an identified configuration message allows a switchover into a confirmed operating mode at any arbitrary time, to the extent that the operating mode is supported.

10. The method as recited in claim 1, further comprising:
checking to determine whether the sender receives the flow control telegram after the test or configuration message within a predefinable second time period.

11. The method as recited in claim 10, wherein the second time period is identical with the first time period.

12. The method as recited in claim 1, wherein the data transmission is executed according to the ISO protocol 15765-2.

13. The method as recited in claim 1, wherein a first flow control telegram type is used as a positive confirmation and a second flow control telegram type is used as a negative confirmation.

14. The method as recited in claim 1, further comprising:
checking, by the sender, whether a flow control telegram is received within a predefinable first time period after sending at least one message; and
in case of an error, repeating by the sender, at least one of a last sent data telegram or all last sent data telegrams of a data transmission.

15. The method as recited in claim 1, wherein there is no intermediate transmission unit between the receiver and the sender.

16. The method as recited in claim 1, further comprising:
checking, by the sender, whether a flow control telegram is received within a predefinable first time period after sending at least one message; and
in case of an error, repeating by the sender, at least one of a last sent data telegram or all last sent data telegrams of a data transmission;
wherein the data transmission is executed according to the ISO protocol 15765-2, and wherein a first flow control telegram type is used as a positive confirmation and a second flow control telegram type is used as a negative confirmation.

17. A storage device storing a computer program, which is executable by a hardware processor, comprising:
a program code arrangement having program code, which is executable by the hardware processor for performing the following:
transmitting, by at least one sender data in a form of data telegrams to at least one receiver, a data transmission taking place via at least one data telegram;
transmitting, by the receiver, at least one flow control telegram to the sender when the data of a data transmission is transmitted in a segmented manner in a first data telegram and at least one subsequent data telegram; and
transmitting an additional flow control telegram from the receiver to the sender after a last data telegram of a data transmission;
wherein the sender checks whether the receiver can be operated in a confirmed transmission mode with sending of the flow control telegram at the end of the data transmission in that the sender sends one or more test or configuration messages and checks receipt of a corresponding flow control telegram as a confirmation, so as to provide efficient network security, in which the network mac be operated in the confirmed transmission mode and a conventional transmission protocol, and in which before communicating in the more advanced mode of the confirmed transmission mode, the sender checks whether such an operation is feasible.

18. The storage device as recited in claim 17, wherein the data transmission is executed according to ISO protocol 15765-2, and wherein a first flow control telegram type is used as a positive confirmation and a second flow control telegram type is used as a negative confirmation.

19. The storage device as recited in claim 18, wherein two transmission modes are differentiated, a first transmission mode allowing the transmission of the additional flow control telegram from the receiver to the sender after a last data telegram of a data transmission, and a second transmission mode not allowing the transmission, the sender operating in the first transmission mode upon receipt of the flow control telegram after one of the test and the configuration message at the sender, and otherwise switching over to the second transmission mode.

20. The storage device as recited in claim 19, wherein, in each instance, a first message already waiting to be sent to a specific receiver is also selected as the test message.

21. The storage device as recited in claim 19, wherein an identified configuration message allows a switchover into a confirmed operating mode at any arbitrary time, to the extent that the operating mode is supported.

22. The storage device as recited in claim 19, wherein the sender checks to determine whether the sender receives the flow control telegram after one of the test and the configuration message within a predefinable second time period, and wherein the second time period is identical with the first time period.

23. The storage device as recited in claim 17, wherein two transmission modes are differentiated, a first transmission mode allowing the transmission of the additional flow control telegram from the receiver to the sender after a last data telegram of a data transmission, and a second transmission mode not allowing the transmission, the sender operating in the first transmission mode upon receipt of the flow control telegram after one of the test and the configuration message at the sender, and otherwise switching over to the second transmission mode.

24. The storage device as recited in claim 23, wherein, in each instance, a first message already waiting to be sent to a specific receiver is also selected as the test message.

25. The storage device as recited in claim 23, wherein an identified configuration message allows a switchover into a confirmed operating mode at any arbitrary time, to the extent that the operating mode is supported.

26. The storage device as recited in claim 17, wherein the sender checks to determine whether the sender receives the flow control telegram after one of the test and the configuration message within a predefinable second time period.

27. The storage device as recited in claim 26, wherein the second time period is identical with the first time period.

28. The storage device as recited in claim 17, wherein the data transmission is executed according to ISO protocol 15765-2, and wherein a first flow control telegram type is used as a positive confirmation and a second flow control telegram type is used as a negative confirmation, and wherein the sender checks whether a flow control telegram is received within a predefinable first time period after sending at least one message, wherein for an error, the sender repeats at least one of a last sent data telegram and all last sent data telegrams of a data transmission.

29. A device for monitoring a data transmission between at least two network users, at least one sender transmitting data in the form of data telegrams to at least one receiver, a data transmission taking place via at least one data telegram, the device comprising:
a hardware processor;
a transmitter at the receiver configured to transmit at least one flow control telegram to the sender when the data of a data transmission is transmitted in a segmented manner in a first data telegram and at least one subsequent data telegram; and
an arrangement at the receiver configured to transmit an additional flow control telegram from the receiver to the sender after a last data telegram of a data transmission;
wherein the sender checks whether the receiver can be operated in a confirmed transmission mode with sending of the flow control telegram at the end of the data transmission in that the sender sends one or more test or configuration messages and checks receipt of a corresponding flow control telegram as a confirmation, so as to provide efficient network security, in which the network may be operated in the confirmed transmission mode and a conventional transmission protocol, and in which before communicating in the more advanced mode of the confirmed transmission mode, the sender checks whether such an operation is feasible.

30. The device as recited in claim 29, wherein the data transmission is executed according to ISO protocol 15765-2, and wherein a first flow control telegram type is used as a positive confirmation and a second flow control telegram type is used as a negative confirmation.

31. The device as recited in claim 30, wherein two transmission modes are differentiated, a first transmission mode allowing the transmission of the additional flow control telegram from the receiver to the sender after a last data telegram of a data transmission, and a second transmission mode not allowing the transmission, the sender operating in the first transmission mode upon receipt of the flow control telegram after one of the test and the configuration message at the sender, and otherwise switching over to the second transmission mode.

32. The device as recited in claim 31, wherein, in each instance, a first message already waiting to be sent to a specific receiver is also selected as the test message.

33. The device as recited in claim 31, wherein an identified configuration message allows a switchover into a confirmed operating mode at any arbitrary time, to the extent that the operating mode is supported.

34. The device as recited in claim 31, wherein the sender checks to determine whether the sender receives the flow control telegram after one of the test and the configuration message within a predefinable second time period, and wherein the second time period is identical with the first time period.

35. The device as recited in claim 29, wherein two transmission modes are differentiated, a first transmission mode allowing the transmission of the additional flow control telegram from the receiver to the sender after a last data telegram of a data transmission, and a second transmission mode not allowing the transmission, the sender operating in the first transmission mode upon receipt of the flow control telegram after one of the test and the configuration message at the sender, and otherwise switching over to the second transmission mode.

36. The device as recited in claim 35, wherein, in each instance, a first message already waiting to be sent to a specific receiver is also selected as the test message.

37. The device as recited in claim 35, wherein an identified configuration message allows a switchover into a confirmed operating mode at any arbitrary time, to the extent that the operating mode is supported.

38. The device as recited in claim 29, wherein the sender checks to determine whether the sender receives the flow control telegram after one of the test and the configuration message within a predefinable second time period.

39. The device as recited in claim 38, wherein the second time period is identical with the first time period.

40. The device as recited in claim 29, wherein the data transmission is executed according to ISO protocol 15765-2, and wherein a first flow control telegram type is used as a positive confirmation and a second flow control telegram type is used as a negative confirmation, and wherein the sender checks whether a flow control telegram is received within a predefinable first time period after sending at least one message, wherein for an error, the sender repeats at least one of a last sent data telegram and all last sent data telegrams of a data transmission.

* * * * *